United States Patent Office 3,565,966
Patented Feb. 23, 1971

3,565,966
PREPARATION OF DIALLYL COMPOUNDS
Bernard Delarue, Venissieux, France, assignor to Rhone-Poulenc S.A., Paris, France, a French body corporate
No Drawing. Filed Apr. 22, 1969, Ser. No. 818,442
Claims priority, application France, Apr. 23, 1968, 149,108
Int. Cl. C07c 1/26, 11/12
U.S. Cl. 260—680                                   9 Claims

ABSTRACT OF THE DISCLOSURE

Diallyl and alkyl-substituted diallyls are prepared by reacting allyl chlorides with zinc in the presence of a hexaalkylphosphotriamide.

---

The present invention relates to the preparation of diallyl compounds by the Wurtz coupling of allyl chlorides.

The preparation of diallyl from allyl chloride, itself prepared from propylene, would be of considerable interest if it could be carried out economically. The development of cracking methods has meant that propylene has become one of the most advantageous starting materials for large organic syntheses and in addition the preparation of allyl chloride may be carried out economically, for example, by the action of chlorine on propylene at 500° C. (see Du Pont et al., Bull. Soc. Chim. France 1959, p. 342).

Various methods of converting allyl chloride to diallyl have been proposed, the majority of which consist in carrying out a Wurtz coupling under various conditions. Du Pont et al. (loc. cit.) chose coupling using sodium or copper; the yields obtained are of the order of 60–70%. Zinc has been disregarded, because it reacts fairly violently to give principally gaseous products, including allene.

Other authors have reacted allyl chloride with zinc in various solvents. In particular, Zakharkin et al. (Izv. Akad. Nauk. SSSR. Otdel. Khim. Nauk, No. 1, p. 193, January 1963), have made allyl-zinc chloride (and not diallyl) in excellent yields in dimethylsulphoxide. In dimethylformamide, a reaction with the solvent occurs, which makes it unusable. In addition, Gaudemar (Bull. Soc. Chim. France (1962), p. 975) has reported that allyl chloride does not react with zinc in tetrahydrofuran.

It has now been found that diallyl and its derivatives may be prepared in good yields by reacting allyl chlorides with zinc in the presence of a hexaalkylphosphotriamide of the formula OP[N(R)$_2$]$_3$, where R represents an alkyl radical, preferably a methyl or ethyl radical.

The present invention provides a process for the preparation of diallyl or an alkyl-substituted diallyl which comprises reacting one or more allyl chloride of the formula:

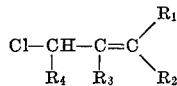

wherein R$_1$, R$_2$, R$_3$ and R$_4$ are the same or different and each represents a hydrogen atom or an alkyl radical containing 1 to 4 carbon atoms, with zinc in the presence of a hexaalkylphosphotriamide of the formula

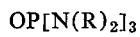

wherein R represents an alkyl radical.

Hexamethylphosphotriamide, hereinafter referred to as HMPT, is generally used as the solvent as it is readily obtainable.

In general the allyl chlorides used in the process of this invention have in all 3 to 10 carbon atoms. Mixtures of allyl chlorides may be used.

To carry out the process of this invention, it is sufficient to contact the allyl chloride with the zinc in the presence of the hexaalkylphosphotriamide. To start the reaction it is often necessary to heat the reactants in the presence of an initiator such as, for example, iodine, an alkyl or allyl iodide, or an organo-zinc compound of the alkyl-zinc or allyl-zinc halide type.

The order in which the reactants are mixed in not imperative, but to prevent a reaction which is difficult to control, it is preferable first to prepare a suspension of zinc in the hexaalkylphosphotriamide and then gradually to add the allyl chloride to this suspension.

The reaction temperature is usually the reflux temperature of the reaction medium at the pressure used. This temperature varies during the reaction. However, a temperature below the reflux temperature may also be used.

The process may be carried out under pressure or under a partial vacuum but it is generally simpler and more economical to operate at atmospheric pressure.

As in all processes using organo-zinc derivatives as reactants or as intermediates, water has an inhibiting effect. Therefore, the usual precautions for this type of reaction must be taken to exclude water.

The solvent is usually present in an amount such that the ratio number of moles of hexaalkylphosphotriamide to number of gram-atoms of zinc is 1.5:1 to 3:1. There is no practical advantage in employing larger quantities of the amide. Smaller quantities may cause an excessive rise in the viscosity of the reaction medium due to formation of complexes between the zinc chloride formed and the solvent.

The amount of allyl chloride relative to the zinc used is not critical. In order to have a high conversion relative to the allyl chloride and relative to the zinc, these two reactants are usually used in a proportion of approximately two moles of allyl chloride to one gram-atom of zinc.

When the reaction is complete, the various constituents of the reaction mixture may be separated by any known method, preferably by distillation.

The diallyl compounds prepared by the process of the invention may be used as synthesis intermediates, particularly in the cycloalkylation of aromatic compounds. In addition, either alone or in admixture with other olefins, they can be used to prepare macromolecules by the known processes of vinyl polymerisation [see United States Patent No. 3,052,735, and Bruson et al. J. Amer. Chem. Soc. 62, 36–44 (1940)].

The following examples illustrate the invention.

EXAMPLE 1

590 g. of zinc (i.e. 9 gram-atoms) in the form of a coarse powder of grains having a diameter of 0.15 to 0.2 mm., 1606 g. of HMPT (i.e. 9 moles), [commercial product redistilled and preserved over a molecular sieve (alkali metal alumina silicate)] and 10 cc. of allyl iodide are introduced into a 6-litre round-bottomed flask provided with a condenser, a dropping funnel and a thermometer tube under a stream of dry nitrogen. The flow of gas is reduced to a simple bubble-by-bubble flow, and then allyl chloride is added slowly from the dropping funnel. When 100 g. of this chloride have been added, the temperature suddenly rises to 76° C. It is then allowed to fall to about 55° C., whereupon the addition of the allyl chloride is continued, the temperature being maintained at 55 to 60° C. When 500 cc. of allyl chloride (i.e. 470 g.) have been added, 500 cc. of HMPT (i.e. 510 g.) are added rapidly and the allyl chloride is again slowly introduced. This is repeated until a total of 1370 g. of allyl chloride (18 moles) and 3212 g. of HMPT (18 moles) have been added during the experiment.

When all the reactants have been added, heating is continued for 7 hours at 70° C. An 80% yield (based on the allyl chloride added) of diallyl (1,5-hexadiene) is collected by distillation.

EXAMPLES 2 TO 4

A series of experiments is carried out using different allyl chlorides under different conditions.

First a suspension of zinc powder in HMPT is prepared, the zinc and the HMPT used being similar to those used in Example 1. One gram of iodine is then added and the allyl chloride is then added slowly and continuously so as to keep the reaction medium boiling moderately.

The following table shows the reaction conditions and the results obtained.

ture is then maintained at 55° C. for 15 hours. A 73% yield (based on the converted starting material) of 2,5-dimethyl-1,5-hexadiene is obtained by distillation.

I claim:

1. A process for the preparation of diallyl or an alkyl-substituted diallyl which comprises reacting one or more allyl chloride of the formula:

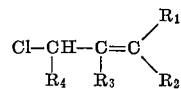

wherein $R_1$, $R_2$, $R_3$ and $R_4$ are the same of different and each represents a hydrogen atom or an alkyl radical containing 1 to 4 carbon atoms, with zinc in the presence of a hexaalkylphosphotriamide of the formula:

$$OP[N(R)_2]_3$$

wherein R represents an alkyl radical.

| Example | Allyl chloride used | | Quantity of HMPT (moles) | Quantity of zinc (gram-atoms) | Temperature | Yield |
|---|---|---|---|---|---|---|
| | Nature | Quantity (moles) | | | | |
| 2 | Cl—CH₂—CH=CH₂ | 4.3 | 4.5 | 2 | 55° to 72° C. | 82% of 1,5-hexadiene. |
| 3 | CH₃\C=CH—CH₂Cl /CH₃ | 2 | 2.5 | 1 | 60° to 75° C. | 68% of 2,7-dimethyl 2-6,octadiene. |
| 4 | CH₃\C=CH—CH₂Cl /CH₃ <br> CH₃=CH—CH₂Cl (in admixture) | 1 <br><br> 1 | 2.5 | 1 | 60° to 80° C. | 23% of 1,5-hexadiene; 25.5% of 2-methyl-2,6-heptadiene; 25.4% of 2,7-dimethyl-2,6-octadiene. |

EXAMPLE 5

A suspension of zinc in HMPT (1 gram-atom of zinc to 2.5 moles of HMPT) is prepared as described in Examples 2 to 4, 1 gram of iodine is added and allyl chloride is continuously and slowly introduced while the reaction medium is heated. When a sudden change in the temperature of the reaction medium indicates that the reaction has started, the mixture is cooled to —5° C. and this temperature is maintained without reflux during the addition of allyl chloride (1 mole). An 80% yield of 1,5-hexadiene is obtained.

EXAMPLE 6

65.37 g. of zinc, 392.5 g. of HMPT, and 1.0 g. of iodine are added to a 1-litre, round-bottomed flask provided with a stirrer, a thermometer, a dropping funnel, a reflux condenser and a dry atmosphere. The zinc and the HMPT used are similar to those used in Example 1. The temperature of the reaction mixture is raised to 70° C. and methylallyl chloride (1-chloro-2-methyl-2-propene) is slowly introduced. After 25 g. have been added, the temperature suddenly rises. It is allowed to fall to 70° C. and the addition of the allyl chloride is then continued with the temperature being maintained at 70° C. by cooling using a water bath. After 2½ hours, a total of 181 g. of methylallyl chloride has been introduced. The mix- 2. Process according to claim 1 wherein the allyl chloride contains a total of 3 to 10 carbon atoms.

3. Process according to claim 1 wherein the allyl chloride used is allyl chloride, 1-chloro-3-methyl-but-2-ene or methylallyl chloride.

4. Process according to claim 1 wherein the reaction is effected in the presence of hexaethylphosphotriamide.

5. Process according to claim 1 wherein the reaction is effected in the presence of hexamethylphosphotriamide.

6. Process according to claim 1 wherein an initiator is used.

7. Process according to claim 1 wherein the ratio of the number of moles of hexaalkylphosphotriamide to number of gram-atoms of zinc is 1.5:1 to 3:1.

8. Process according to claim 1 wherein two moles of the allyl chloride to one gram-atom of zinc are used.

9. Process according to claim 1 wherein the reaction is effected at a temperature from —5° C. to the reflux temperature of the mixture.

References Cited
UNITED STATES PATENTS

| 1,884,002 | 10/1932 | Leyes | 260—680 |
| 3,052,735 | 9/1962 | Hodgson et al. | 260—680X |

PAUL M. COUGHLAN, JR., Primary Examiner